United States Patent [19]
Chen et al.

[11] Patent Number: 5,838,416
[45] Date of Patent: Nov. 17, 1998

[54] DEVICE AND METHOD FOR ENHANCING THE VIEWING ANGLE OF A DISPLAY

[75] Inventors: Diana Chen, Gilbert; Phil Wright, Scottsdale; Karen E. Jachimowicz, Laveen, all of Ariz.

[73] Assignee: Motorola, Inc., Schaumburg, Ill.

[21] Appl. No.: 799,316

[22] Filed: Feb. 13, 1997

[51] Int. Cl.$^6$ ........................................................ G02F 1/13
[52] U.S. Cl. ................................................................ 349/202
[58] Field of Search ...................................... 349/201, 202

[56] References Cited

U.S. PATENT DOCUMENTS

| | | | |
|---|---|---|---|
| 4,729,641 | 3/1988 | Matsuoka et al. | 349/202 |
| 4,937,539 | 6/1990 | Grinberg et al. | 349/202 |

*Primary Examiner*—William L. Sikes
*Assistant Examiner*—James A. Dudek
*Attorney, Agent, or Firm*—Eugene A. Parsons

[57] ABSTRACT

A device and method for enhancing the viewing angle of a display including the positioning of a liquid crystal beam deflector on display device, such as a liquid crystal display device. The liquid crystal beam deflector is capable of deflecting a display image incident thereon, thereby deflecting a primary viewing axis, resulting in an altered viewing axis and/or a broader viewing cone. The resultant effect allows the user to view the display image from the altered viewing angle or at any position within the broader viewing cone, to provide for a higher contrast output image by deflecting the brightest image away from the direction of specular reflection in ambient illuminated reflective displays.

24 Claims, 2 Drawing Sheets

DEVICE AND METHOD FOR ENHANCING THE VIEWING ANGLE OF A DISPLAY

FIELD OF THE INVENTION

The present invention pertains to the field of displays, more particularly to a device and method for enhancing the viewing angle of emissive and non-emissive displays.

BACKGROUND OF THE INVENTION

Flat panel displays (FPDs) are beginning to dominate the display industry, having a great impact within the communications field, medical field, educational field, and automotive industry. In addition, flat panel displays are utilized in the conducting of business and dissemination of information. Liquid crystal displays typically dominate within the field of flat panel displays, however, some serious weaknesses exists with liquid crystal displays. Among these weaknesses are the narrow viewing angle commonly found with liquid crystal displays, low backlight efficiency for transmissive liquid crystal displays, and low display contrast for ambient illuminated reflective liquid crystal displays. Current solutions to these problems include the use of retardation films, multi-domain structures fabricated utilizing multiple rubbing and evaporation techniques, in-plane switching techniques, holographic reflectors, and alternate background emission colors, all of which increase cost of manufacture.

One way to overcome the problem of low backlight efficiency with liquid crystal displays is to utilize collimated light. However, this creates a very narrow viewing angle within which the display can be viewed. In order to increase the angle at which the display may be viewed, the most common and cost effective solution is to utilize optical diffusers, which typically cause scattering loss and lower the contrast because of reflected ambient light. In addition, when ambient light is utilized to provide illumination to a reflective liquid crystal display, specular reflection from the top surface is generally coincident with the reflection containing the brightest image. Accordingly, contrast is significantly degraded.

Thus, there is a need for a small, fast speed, low power device and method for enhancing the viewing angle of a display, such as a liquid crystal display, thus allowing for an altered optical viewing axis or broader viewing cone, while increasing the contrast of the image in a reflective display and allowing for improved efficiency in a transmissive display.

Accordingly, it is desirable to provide for a device and method for enhancing the viewing angle of a display that allows for an altered primary viewing axis, or viewing cone, thereby allowing the user more freedom of movement when viewing the display. In addition, it is desirable to provide for increased backlight efficiency and provide for increased display contrast when utilizing collimated light by altering the output angle of the brightest display image angle from that of the specular reflection angle (glare).

It is a purpose of the present invention to provide for a new and improved device and method for viewing angle enhancement of a display, such as a liquid crystal display, that alters the optical viewing axis, or viewing angle, and/or increases the optical viewing cone of the intended user, thereby permitting the user greater freedom of movement when viewing the display.

It is a purpose of the present invention to provide for a new and improved device and method for viewing angle enhancement of a display, such as a liquid crystal display, that increases the contrast of the display image in an ambient illuminated reflective display.

It is a still further purpose of the present invention to provide for a new and improved device and method for viewing angle enhancement of a display, such as a liquid crystal display, that increases the efficiency of a transmissive display.

It is a still further purpose of the present invention to provide for a device and method for enhancing the viewing angle efficiency of a display, such as a liquid crystal display, including a deflecting device, that statically or continuously directionally deflects a beam of light incident thereon dependent upon the state of operation of the deflecting device.

It is a further purpose of the present invention to provide for a device and method for enhancing the viewing angle of a display, such as a liquid crystal display, that can be incorporated into a new and improved visual display system for display resolution enhancement, thereby allowing for the incorporation of the scanner into miniature visual displays.

SUMMARY OF THE INVENTION

The above problems and others are substantially solved and the above purposes and others are realized in a device for enhancing the viewing angle of a display comprising a display device, including a display image viewable at a primary viewing axis and a liquid crystal beam deflector positioned adjacent a surface of the display device. In addition, provided is a method for enhancing the viewing angle of a display comprising the steps of providing a display device including a display image viewable at a primary viewing axis and positioning a liquid crystal beam deflector adjacent a surface of the display device. The liquid crystal beam deflector is capable of deflecting the display image incident thereon, thereby deflecting the primary viewing axis, resulting in an altered viewing axis and/or a broader viewing cone. The resultant effect is in allowing the user to view the display image from the altered viewing angle or at any position within the broader viewing cone.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

Figure 1:
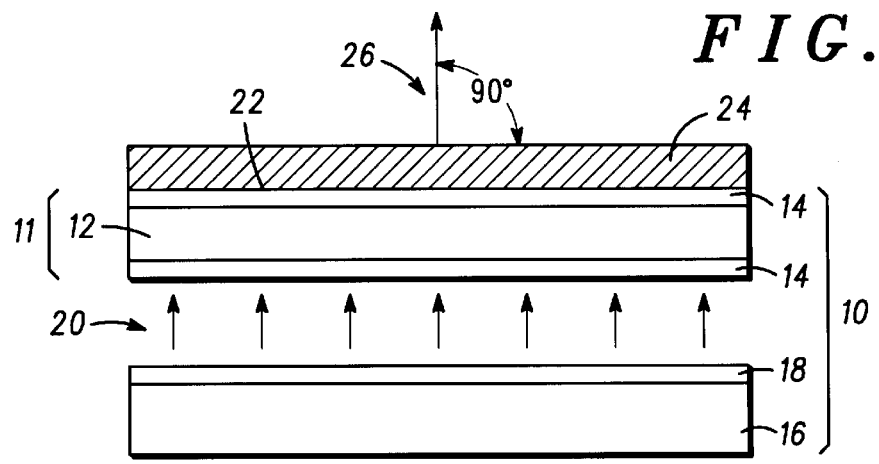
FIG. 1 is a simplified cross-sectional view of a two-directional liquid crystal display and beam deflector in an "OFF" mode utilized in the device and method for enhancing the viewing angle of liquid crystal display according to the present invention.
Figure 2:
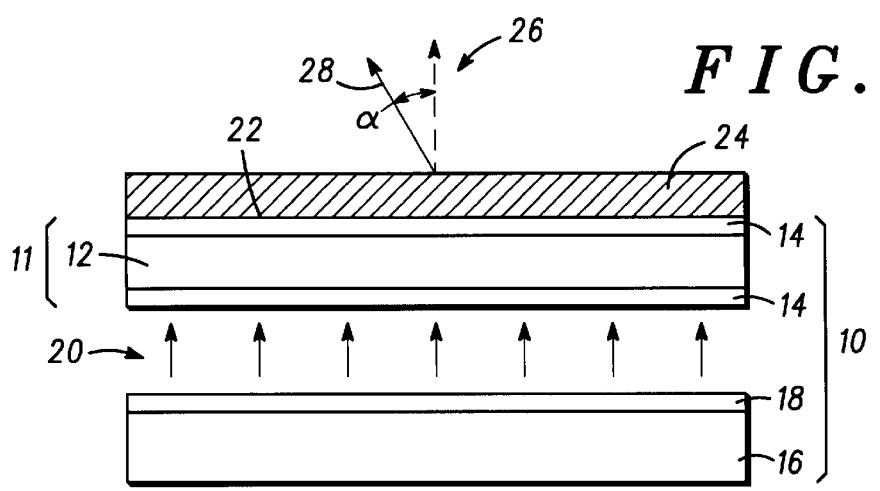
FIG. 2 is a simplified cross-sectional view of a two-directional liquid crystal display and beam deflector in an "ON" mode utilized in the device and method for enhancing the viewing angle of liquid crystal display according to the present invention.

Referring now to the accompanying drawings, illustrated in FIGS. 1 and 2 are simplified cross-sectional views of a two-directional liquid crystal display (LCD) and beam deflector in an "OFF" mode and "ON" mode, respectively. The liquid crystal display and beam deflector as illustrated are utilized in the method for enhancing the viewing angle of a display according to the present invention. It should be understood that the device and method for enhancing the viewing angle of a display of the present invention is intended for use with both emissive displays and non-emissive displays. Emissive displays generally include plasma displays, field emission displays (FEDs), laser displays, cathode ray tube (CRT) displays, vacuum fluorescent displays (VFDs), inorganic light emitting device (LED) displays, and organic light emitting device (OLED) displays. In general, while the device and method of this particular disclosure can be utilized with both emissive and non-emissive displays, detailed description will be given to the utilization of non-emissive displays, such as a liquid crystal display (LCD), in that LCDs typically exhibit the small viewing cone, backlight efficiency and display contrast problems previously discussed.

As illustrated in FIGS. 1 and 2, there is provided a liquid crystal display 10, which generally includes for example a liquid crystal stack formation 11, including a liquid crystal material 12 positioned between two transparent plates 14, such as optically transparent glass, or the like. In this particular embodiment, liquid crystal display 10, further includes a light source 16, and micro-optics 18, which in combination generate collimated light 20 which is incident upon the liquid crystal stack formation 11. Micro-optics 18 in this particular embodiment serve to collimate the light incident thereon, but it should be understood that other types of light ranging from completely collimated light to completely diffuse light can be utilized and the present invention is not limited to the use of completely collimated light. There is positioned on an uppermost adjacent surface 22 of liquid crystal display 10, more specifically on an uppermost adjacent surface of transparent plate 14 of liquid crystal stack formation 11, a liquid crystal beam deflector 24, or scanner. Liquid crystal beam deflector 24 serves to deflect light passing therethrough when beam deflector 24 is operational or in an "ON" mode. Liquid crystal beam deflector 24, in this specific embodiment, operates to statically deflect incident light to an alternate angle. It is disclosed that liquid crystal beam deflector 24 generally includes a spatially modulating material, such as a liquid crystal material, thereby capable of modulating the phase of light passing therethrough, thus the directional path of the emitted light. Further information regarding the structure and fabrication of a liquid crystal beam deflector, or scanner, as utilized in the present invention can be found in the following pending U.S. patent applications: (i) U.S. patent application Ser. No. 08/651,188, filed May 17, 1996, entitled "NEMATIC LIQUID CRYSTAL PHASE SPATIAL LIGHT MODULATOR FOR ENHANCED DISPLAY RESOLUTION", (ii) pending U.S. patent application Ser. No. 08/651,189, filed May 17, 1996, entitled "CHIRAL SMECTIC LIQUID CRYSTAL PHASE SPATIAL LIGHT MODULATOR FOR UNPOLARIZED LIGHT", (iii) pending U.S. patent application Ser. No. 08/726,005, filed Oct. 4, 1996, entitled "BI-STABLE NON-PIXELLATED PHASE SPATIAL LIGHT MODULATOR FOR ENHANCED DISPLAY RESOLUTION AND METHOD OF FABRICATION", (iv) pending U.S. patent application bearing attorney docket no. CR 96-181, mailed Dec. 18, 1996, entitled "LARGE ANGLE LIQUID CRYSTAL PHASE SPATIAL LIGHT MODULATOR", (v) pending U.S. patent application, bearing attorney docket no. CR 96-090, mailed Dec. 18, 1996, entitled 'FAST SPEED LIQUID CRYSTAL PHASE SPATIAL LIGHT MODULATOR FOR ENHANCED DISPLAY RESOLUTION", and (vi) pending U.S. patent application, bearing attorney docket no. CR 96-097, mailed Dec. 18, 1996, entitled "MULTI-DIRECTIONAL LIQUID CRYSTAL PHASE SPATIAL LIGHT MODULATOR FOR ENHANCED DISPLAY RESOLUTION", all assigned to the same assignee and incorporated herein by this reference.

In this specific embodiment, light source 16, generally includes fluorescent light tubes, or the like, and emits light which passes through micro-optics 18, which serve to collimate the emitted light. The collimated light 20 passing therethrough liquid crystal stack formation 11, more specifically liquid crystal material 12, and deflector 24 is deflected when deflector 24 is operational or in an "ON" mode (as illustrated in FIG. 2), thus altering the primary viewing angle 26 of a display image (not shown) to an altered primary viewing angle 28. Altered primary viewing angle 28 is altered to an angle α relative to primary viewing angle 26, as indicated by the directional arrows in FIGS. 1 and 2. This alteration of primary viewing angle 26 is advantageous when the viewer is positioned to view the display image at a viewing angle other than 90°, as illustrated in FIG. 1. When liquid crystal beam deflector 24 is a multiple binary beam deflector, several optical viewing angles can be achieved.

Figure 3:
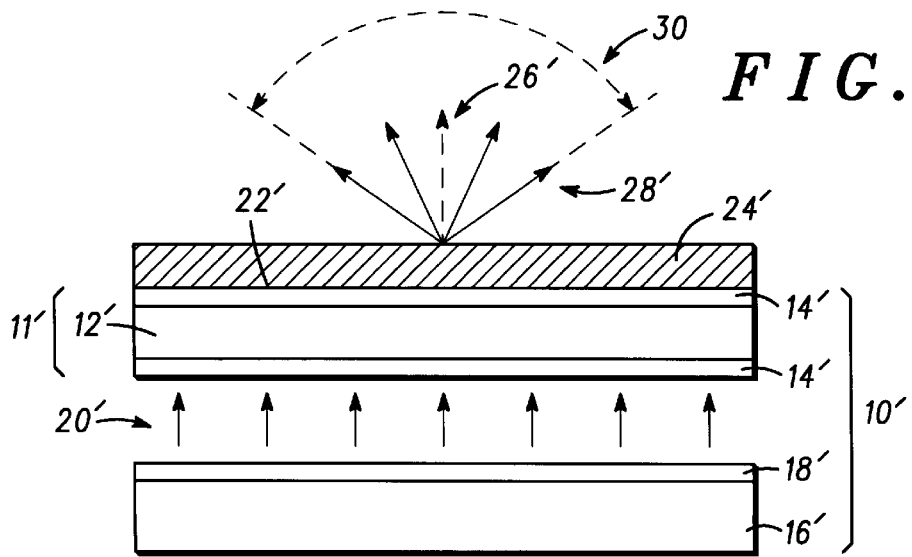
FIG. 3 is a simplified cross-sectional view of a multi-direction liquid crystal display and beam deflector utilized in the device and method for enhancing the viewing angle of a liquid crystal display according to the present invention.

Referring now to FIG. 3, illustrated is a simplified cross-sectional view of a multi-directional liquid crystal display and beam deflector utilized in the device and method for enhancing the viewing angle of a display according to the present invention. It should be noted that all components similar to the components illustrated in FIGS. 1 and 2, are designated with similar numbers, having a prime added to indicate the different embodiment. Generally, illustrated is a liquid crystal display 10', including a liquid crystal stack formation 11', composed of a liquid crystal material 12' and a plurality of transparent plates 14'. In addition, liquid crystal display 10' is formed of a light source 16' and micro-optics 18'. Liquid crystal display 10' has positioned on an uppermost surface 22' of glass plate 14', a liquid crystal beam deflector 24'. During operation, in this particular embodiment, liquid crystal beam deflector 24' operates in a continuous scan or sweep mode, thereby altering a primary viewing angle 26', so as to generate a plurality of altered viewing angles 28'. This continuous scanning allows for the optimal viewing angle to be continuously varied, thus generating a broad viewing cone 30 and allowing greater freedom of movement for the user.

Figure 4:
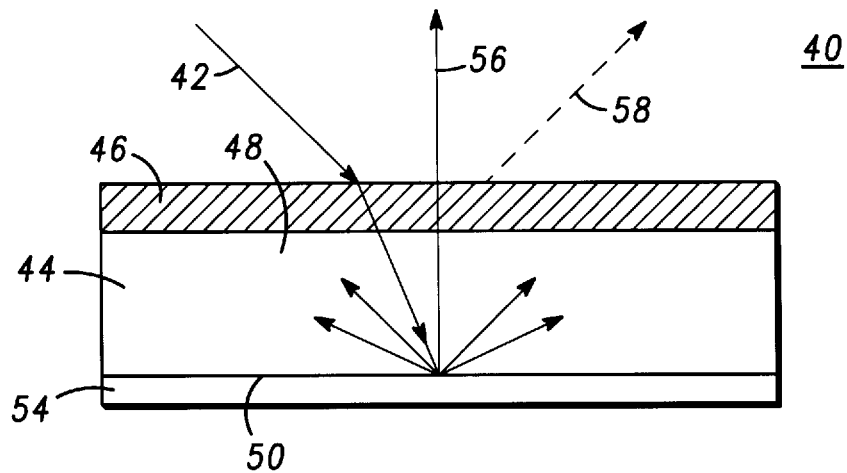
FIG. 4 is a simplified cross-sectional view of liquid crystal display and transmissive beam deflector utilized in the device and method for enhancing the viewing angle of a liquid crystal display according to the present invention.

FIG. 4 is a simplified cross-sectional view of liquid crystal display and transmissive beam deflector utilized in the device and method for enhancing the viewing angle of a display according to the present invention. In this particular embodiment, an ambient illuminated reflective display device 40 is illustrated. Generally in displays of this type the angle of specular reflection, the glare from the display screen, is generally at an angle similar to that of the display image, making viewing of the display image difficult. As illustrated in FIG. 4, device 40 generally includes a liquid crystal display 44, composed of a liquid crystal material positioned therebetween two transparent plates (not shown). A liquid crystal beam deflector 46, or scanner, is positioned on an uppermost adjacent surface 48 of liquid crystal display 44. In this particular embodiment, liquid crystal beam deflector 46 is fabricated substantially transparent, operating in either a static or scanning transmissive mode, thereby allowing for the positioning adjacent an uppermost surface 48 of liquid crystal display 44 and the passage therethrough of reflected light. It should be understood that liquid crystal display 44 may have formed as a part thereof at least two cross-polarizer elements (not shown) for controlling the polarization of light passing therethrough in the x and y direction. There is positioned on an opposing adjacent surface 50 of liquid crystal display 44, a reflective element 54. During operation, ambient light 42 entering device 40, passes through liquid crystal display 44, is reflected by reflective element 54, and passes back through transmissive liquid crystal beam deflector 46. Liquid crystal beam deflector 46 deflects the light passing therethrough dependent upon mode of operation, thus generating a display image 56 at an output angle altered from the angle of specular reflection 58. This deflection of light provides for a higher contrast display image 56 for ambient illuminated reflective displays.

Figure 5:
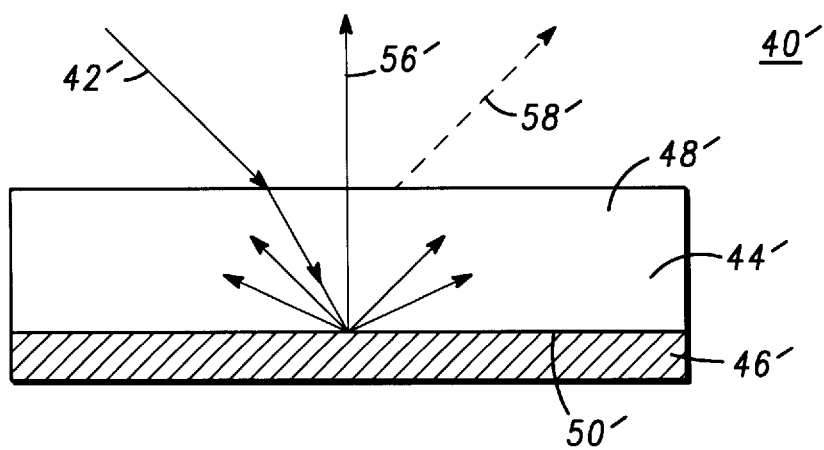
FIG. 5 is a simplified cross-sectional view of a liquid crystal display and reflective beam deflector utilized in the device and method for enhancing the viewing angle of a liquid crystal display according to the present invention.

In the alternative, and as illustrated in FIG. 5, in a simplified cross-sectional view, is a display device 40', generally similar in operation to display device 40 of FIG. 4, previously described. It should be noted that all components similar to the components illustrated in FIG. 4, are designated with similar numbers, having a prime added to indicate the different embodiment. In this particular embodiment, a liquid crystal beam deflector 46' is fabricated to include reflective properties. Accordingly, when positioned adjacent a lower adjacent surface 50' of a liquid crystal display 44', ambient light 42' is deflected by deflector 46', thereby generating a reflected, deflected display image 56'. As previously described, display image 56' is generated at a different output angle than that of an angle of specular reflection 58' of device 40'. It should be understood that device 40' is operational in both a static reflective mode, thereby statically altering the output angle of display image 56', as illustrated in FIG. 5 or in a scanning reflective mode, thus capable of continuously scanning or sweeping the display image across varying output angles, therefore generating a broad viewing cone.

Thus, disclosed is a new and improved device and method for enhancing the viewing angle of a display. More specifically, disclosed is a device and method for improving the viewing angle of a liquid crystal display, improving efficiency of a transmissive liquid crystal display and improving the display contrast for ambient illuminated reflective liquid crystal displays. During operation, the display device, including the liquid crystal display and a liquid crystal beam deflector serve to shift the viewing angle of a display image, thereby improving efficiency of the display or improving display contrast by deflecting the display image away from the output angle of specular reflection, while creating an altered viewing angle or broader viewing cone, While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A device for enhancing the viewing angle of a display comprising a:

a display, generating a display image viewable at a primary viewing axis; and a liquid crystal beam deflector, positioned adjacent a surface of the display, the liquid crystal beam deflector capable of deflecting the display image incident thereon, thereby deflecting the primary viewing axis and generating at least one altered primary viewing axis.

2. A device for enhancing the viewing angle of a display as claimed in claim 1 wherein the display includes a liquid crystal display.

3. A device for enhancing the viewing angle of a display as claimed in claim 2 wherein the liquid crystal display includes a liquid crystal stack formation characterized by a liquid crystal material positioned therebetween a plurality of transparent plates.

4. A device for enhancing the viewing angle of a display as claimed in claim 2 wherein the liquid crystal beam deflector operates in one of a static mode and a continuous scan mode.

5. A device for enhancing the viewing angle of a display as claimed in claim 2 wherein the liquid crystal display is a transmissive liquid crystal display and includes a backlight light source.

6. A device for enhancing the viewing angle of a display as claimed in claim 2 wherein the liquid crystal display is a reflective liquid crystal display, dependent upon an ambient light source.

7. A device for enhancing the viewing angle of a display as claimed in claim 6 wherein the liquid crystal beam deflector is optically transparent and operates in a transmissive mode.

8. A device for enhancing the viewing angle of a display as claimed in claim 6 wherein the liquid crystal beam deflector is fabricated to include reflective optical properties and operates in a reflective mode.

9. A method for enhancing the viewing angle of a display comprising the steps of:

providing a display including a display image viewable at a primary viewing axis; and positioning a liquid crystal beam deflector adjacent a surface of the display, the liquid crystal beam deflector capable of deflecting the display image incident thereon, thereby deflecting the primary viewing axis.

10. A method for enhancing the viewing angle of a display as claimed in claim 9 wherein the step of providing a display includes providing a liquid crystal display.

11. A method for enhancing the viewing angle of a display as claimed in claim 10 wherein the liquid crystal display includes a liquid crystal material positioned therebetween two transparent plates.

12. A method for enhancing the viewing angle of a display as claimed in claim 10 wherein the step of providing a display includes providing an ambient illuminated reflective display.

13. A method for enhancing the viewing angle of a display as claimed in claim 12 wherein the step of positioning a liquid crystal beam deflector includes positioning a transmissive liquid crystal beam deflector adjacent the ambient illuminated reflective display, thereby permitting the display image incident thereon to pass therethrough.

14. A method for enhancing the viewing angle of a display as claimed in claim 12 wherein the step of positioning a liquid crystal beam deflector includes positioning a reflective liquid crystal beam deflector adjacent the ambient illuminated reflective display, the reflective liquid crystal beam deflector including reflective properties and thereby deflecting and reflecting the display image incident thereon back through the liquid crystal display.

15. A method for enhancing the viewing angle of a display as claimed in claim 10 wherein the liquid crystal beam deflector deflects the primary viewing axis statically to an alternate angle, thereby shifting the primary viewing axis and generating an altered viewing angle.

16. A method for enhancing the viewing angle of a display as claimed in claim 10 wherein the liquid crystal beam deflector continuously scans the primary viewing axis across varying angles, thus generating a plurality of altered viewing angles and a broad viewing cone.

17. A method for enhancing the viewing angle of a display as claimed in claim 10 wherein the step of providing a liquid crystal display includes providing a light source and micro-optics for generating collimated light, the collimated light incident upon a liquid crystal material, thereby generating the display image.

18. A method for enhancing the viewing angle of a display comprising the steps of:
    providing a liquid crystal display including a display image viewable at a primary viewing axis, the liquid crystal display including a liquid crystal stack formation, characterized by a liquid crystal material positioned therebetween a plurality of transparent plates; and
    positioning a liquid crystal beam deflector adjacent a surface of the liquid crystal display, the liquid crystal beam deflector capable of deflecting the display image incident thereon, thereby deflecting the primary viewing axis and generating at least one alternate primary viewing axis.

19. A method for enhancing the viewing angle of a display as claimed in claim 18 wherein the liquid crystal display further includes a light source and micro-optics for generating collimated light, the collimated light incident upon the liquid crystal stack formation, thereby generating the display image.

20. A method for enhancing the viewing angle of a display as claimed in claim 18 wherein the step of providing a liquid crystal display includes providing a backlight illuminated transmissive display.

21. A method for enhancing the viewing angle of a display as claimed in claim 18 wherein the step of providing a display includes providing an ambient illuminated reflective display.

22. A method for enhancing the viewing angle of a display as claimed in claim 21 wherein the step of positioning a liquid crystal beam deflector includes positioning a transmissive liquid crystal beam deflector adjacent the ambient illuminated reflective display, thereby permitting the display image incident thereon to pass therethrough.

23. A method for enhancing the viewing angle of a display as claimed in claim 21 wherein the step of positioning a liquid crystal beam deflector includes positioning a reflective liquid crystal beam deflector adjacent the ambient illuminated reflective display, the reflective liquid crystal beam deflector including reflective properties and thereby deflecting and reflecting the display image incident thereon back through the liquid crystal display.

24. A method for enhancing the viewing angle of a display as claimed in claim 18 wherein the liquid crystal beam deflector one of statically deflects the display image to an alternate primary viewing angle, thereby shifting the primary viewing axis and continuously scanning the display image across varying angles, thus generating a plurality of altered viewing angles and a broad viewing cone.

\* \* \* \* \*